United States Patent
Schroeder et al.

(10) Patent No.: US 11,279,205 B2
(45) Date of Patent: Mar. 22, 2022

(54) METHOD FOR OPERATING A COOLANT CIRCUIT AND VEHICLE AIR-CONDITIONING SYSTEM

(71) Applicant: AUDI AG, Ingolstadt (DE)

(72) Inventors: Dirk Schroeder, Manching (DE); Christian Rebinger, Munich (DE)

(73) Assignee: AUDI AG, Ingolstadt (DE)

( * ) Notice: Subject to any disclaimer, the term of this patent is extended or adjusted under 35 U.S.C. 154(b) by 97 days.

(21) Appl. No.: 16/754,226

(22) PCT Filed: Oct. 1, 2018

(86) PCT No.: PCT/EP2018/076575
§ 371 (c)(1),
(2) Date: Apr. 7, 2020

(87) PCT Pub. No.: WO2019/076615
PCT Pub. Date: Apr. 25, 2019

(65) Prior Publication Data
US 2020/0269654 A1  Aug. 27, 2020

(30) Foreign Application Priority Data
Oct. 16, 2017  (DE) .................... 10 2017 218 424.8

(51) Int. Cl.
*B60H 1/00* (2006.01)
(52) U.S. Cl.
CPC ............ *B60H 1/00921* (2013.01); *B60H 2001/00928* (2013.01); *B60H 2001/00949* (2013.01)
(58) Field of Classification Search
CPC ........... B60H 1/00899; B60H 1/00921; B60H 2001/00928; B60H 2001/00949; B60H 2001/326
See application file for complete search history.

(56) References Cited

U.S. PATENT DOCUMENTS

| 9,242,527 B2 * | 1/2016 | Graaf .................... B60H 1/143 |
| 2014/0075966 A1 * | 3/2014 | Schmitz ............ B60H 1/00921 62/56 |
| 2016/0129757 A1 | 5/2016 | Kodera et al. |

FOREIGN PATENT DOCUMENTS

| DE | 10163607 A1 | 7/2003 |
| DE | 102006024796 A1 | 9/2007 |
| DE | 102007005498 A1 | 7/2008 |

(Continued)

OTHER PUBLICATIONS

Google translate of para. 0017 of Schroeder '162 (DE 102011118162 A1). Original document published May 16, 2013; Google translate performed Aug. 20, 2021. (Year: 2013).*

(Continued)

*Primary Examiner* — Marc E Norman
(74) *Attorney, Agent, or Firm* — Maier & Maier, PLLC

(57) ABSTRACT

A method for operating a coolant circuit of a vehicle cooling system in an AC mode and in a heating mode, implemented by a heat pump function, having an evaporator branch including an evaporator and a first expansion element, a coolant compressor, an AC and heat pump branch, having an outer condenser or gas cooler, as a heat pump evaporator having a second expansion element. The AC and heat pump branch is connected to the coolant compressor via a first blocking element and to the evaporator branch via the second expansion element, a heating branch having an inner heating condenser or heating gas cooler and a second blocking element, connected downstream thereto.

15 Claims, 4 Drawing Sheets

(56) References Cited

FOREIGN PATENT DOCUMENTS

DE   102011118162 A1   5/2013
DE   102013021360 A1   6/2015
DE   102015015125 A1   5/2017

OTHER PUBLICATIONS

German Examination Report dated Jul. 17, 2019 in corresponding German Application No. 10 2017 218 424.8; 20 pages; Machine translation attached.
International Search Report with English translation and Written Opinion with Machine translation dated Jan. 16, 2019 in corresponding International Application No. PCT/EP2018/076575; 19 pages.
English translation of the International Preliminary Report on Patentability (Chapter I) dated Apr. 30, 2020, in corresponding International application No. PCT/EP2018/076575; 8 pages.

\* cited by examiner

METHOD FOR OPERATING A COOLANT CIRCUIT AND VEHICLE AIR-CONDITIONING SYSTEM

FIELD

The invention relates to a method for operating a coolant circuit of a vehicle air-conditioning system in AC mode and a heating mode implemented by means of a heat pump function.

BACKGROUND

A method for operating a vehicle air-conditioning system in an AC mode and in a heating mode by means of a water heat pump function is known from DE 10 2013 021 360 A1, wherein said water heat pump function is implemented by means of a chiller. This coolant circuit includes an evaporator branch having an evaporator and an associated expansion element, an AC branch having an outer condenser, which is connected, on the one hand, via a blocking element to a coolant compressor and on the other hand via a branching to the evaporator branch, wherein at least one chiller branch consisting of a chiller and an associated expansion element is connected in parallel to the evaporator branch. Furthermore, a heating branch having an inner heating condenser (also called heating register) connects the high-pressure outlet of the coolant compressor by means of another blocking element to the branching, wherein each of the heating branch and the AC branch is blocked in the direction of this branching by a respective other blocking element. It is therefore possible, by controlling these two blocking elements accordingly, to connect the AC branch in the AC mode via the branching to the evaporator branch and/or the chiller branch or to connect the heating branch in the heating mode via the branching to the chiller branch or both to the chiller branch and the evaporator branch. In the method known from this DE 10 2013 021 360 A1, a coolant temperature at the outlet of the chiller near the condensation curve of the coolant used is set in the pure cooling mode of a vehicle battery thermally connected to the chiller via the position of the expansion element associated with the chiller to achieve a maximum cooling outlet at minimum power consumption of the compressor.

DE 10 2006 024 796 A1 describes a coolant circuit of a vehicle air-conditioning system with a cooling and heating function having a coolant compressor, an outer condenser, and an inner heat exchanger with an associated expansion element, wherein the inner heat exchanger is divided into two partial heat exchangers in the direction of a supply air flow conducted into the passenger compartment. To implement multiple operating modes, the compressed coolant can either be supplied to the outer condenser, the first partial heat exchanger, or distributed between both the outer condenser and the first partial heat exchanger by means of the blocking elements located downstream of the coolant compressor. The first partial heat exchanger is preferably used for cooling the supply air flow, that is, as coolant evaporator, and the second partial heat exchanger inserted downstream in the direction of the supply air flow is preferably used for heating the supply air flow, that is, as an inner heating condenser or heating register. It is further possible to use the two partial heat exchangers at maximum cooling demand as coolant evaporators for cooling or at maximum heat demand for heating. Finally, a reheat mode is provided in that the first partial heat exchanger operates as coolant evaporator and at the same time the second partial heat exchanger operates as heating condenser, such that the condensation heat generated in a first stage by dehumidifying the supply air flow is used together with the compressor waste heat for heating the supply air flow in a second stage.

In these coolant circuits known from prior art, coolant flows through the respective heating registers at a high temperature in heating operation, particularly when using R744 ($CO_2$) as a coolant. Since a heating register is disposed in an air-conditioning device, the high temperatures of the coolant result in high material stress, particularly to the housing of the air conditioning device. This requires costly action for uncoupling the heating register and the lines from the housing of the air-conditioning device.

Furthermore, measures for coolant extraction from dead volumes created in the AC mode or heating mode in the known coolant circuits are required, but these are not implemented optimally with respect to components needed.

For example, coolant is extracted from the AC branch according to DE 10 2013 021 360 A1, particularly for heat pump operation, in that the outer condenser can be connected on the upstream side or, alternatively, on the downstream side via a blocking element and a check valve to the low pressure side of the coolant compressor or at least to the low pressure side. This has the advantage that a return flow into the dead volume is prevented by the check valve, even though the blocking element is open, in the event that the pressure rises and the flow is reversed as a result. A disadvantage in this case are the additional costs caused by components such as the check valve and optionally the entire line with stop valve.

No other measures of extracting coolant from dead volumes in the AC mode or heating mode are provided in the coolant circuit according to DE 10 2006 024 796 A1. This has the disadvantage that an undefined quantity of coolant vanishes in the dead volume or stays there and is no longer available for the active process, which means that the system is in the worst case operated underfilled and inefficiently.

Based on the prior art, the problem arises to provide a method for operating a coolant circuit of a vehicle air-conditioning system in an AC mode and in a heating mode by means of a heat pump function in which high material stress on the housing of an inner heating condenser (heating register), particularly when using R744 as the coolant. It is further the problem of the disclosure to provide a coolant circuit for executing the method according to the disclosure.

SUMMARY

The first problem mentioned is achieved by a method for operating a coolant circuit of a vehicle air-conditioning system.

Such a method for operating a coolant circuit of a vehicle air-conditioning system in an AC mode and in a heating mode implemented by a heat pump function, having:
  an evaporator branch having an evaporator and an expansion element associated with the evaporator,
  a coolant compressor,
  an AC and heat pump branch having an outer condenser or gas cooler and a second expansion element associated with the same in its function as heat pump evaporator for the heating mode, wherein the AC and heat pump branch is connected to the high pressure outlet of the coolant compressor via a first blocking element and to the evaporator branch via the second expansion element,
  a heating branch having an inner heating condenser or heating gas cooler and a second blocking element connected downstream thereto, wherein the heating branch is connected to the high pressure outlet of the coolant compressor via a third blocking element and to the evaporator branch via the second blocking element, a third expansion element with which the heating branch is connected to the AC and heat pump branch, and
a temperature measuring means for determining the coolant temperature at the inlet of the heating condenser or heating gas cooler, characterized in that,
in heating mode, the coolant temperature at the inlet of the inner heating condenser or heating gas cooler is limited to a maximum temperature value.

In this method according to the disclosure, the coolant temperature at the inlet of the inner heating condenser to a maximum temperature value in heating mode prevents damage to the inner heating condenser, primarily however to the plastic housing of the air-conditioning device, the so-called HVAC unit. The maximum temperature value can be determined depending on the maximum permissible and tolerable material temperature of the housing material of the air-conditioning device. In AC mode, a flow through the inner heating condenser is prevented by blocking the heating branch using the second blocking element, thereby protecting the inner heating condenser or the air-conditioning device from damage.

The temperature measuring means is combined with a pressure measuring means to monitor the high pressure at the outlet of the coolant compressor and to limit it to a maximum permissible high pressure value.

Preferably, a temperature measuring means is disposed at the high pressure outlet of the coolant compressor to determine the coolant temperature at the inlet of the inner heating condenser or heating gas cooler, wherein the coolant temperature at the inlet of the heating condenser or heating gas cooler is determined from a characteristic by means of the sensor value generated by the temperature measuring means. Alternatively or in addition, the coolant temperature is determined by means of a temperature measuring means disposed at the inlet of the heating condenser or heating gas cooler. If such a temperature measuring means, for example, a temperature sensor, is used in addition, it can perform a monitoring function to document a protective function.

In an embodiment of the disclosure, the following process steps are performed when starting operation in the AC mode:
extracting coolant from the heating branch by opening the second blocking element and closing both the third blocking element and the third expansion element, and
closing the second blocking element, either if coolant pressure downstream of the second blocking element rises or after a defined period of time.

The existing lines of the coolant circuit are used for this method of implementing an extraction of coolant from a dead volume of the inner heating condenser or heating gas cooler for AC mode, i.e. no additional line sections or valve components are required. The second blocking element is closed as a function of the coolant pressure downstream thereof or after a defined period of time.

The defined period of time is determined in that the system requests a lower air-side evaporator outlet temperature than would be the case in normal operation (e.g. 1° C. instead of 3° C.) for this time window, e.g. limited to 5 minutes. This causes a lower system-side pressure, and extraction potential rises. When the defined and specified period of time elapses, the system is reset to standard parameters, wherein the second blocking element is closed immediately before that to avoid coolant reflux into the heating branch.

If the coolant pressure is used as the signal and reference variable when closing the second blocking element, it can be determined indirectly or directly.

For indirect determination of the coolant pressure, the blower load of a blower of an air-conditioning device and/or the setpoint value of air temperature at the evaporator set by a controller of the coolant circuit and/or the pressure curve of the coolant on the low pressure side of the coolant circuit is/are detected and the second blocking element is closed immediately before the change occurs if the blower load decreases and/or the setpoint value increases and/or the coolant pressure on the low pressure side increases. The signals that a change is imminent can be detected and analyzed by means of the respective (air-conditioning) controllers, such that the second blocking element is closed immediately before the event occurs.

For direct determination off the coolant pressure, it is directly determined downstream of the second blocking element by means of a pressure sensor connected downstream thereof.

In an embodiment, the following process steps are performed when starting operation in the heating mode by means of a heat pump function or a triangular process:
providing a chiller branch having a chiller and an associated fourth expansion element to implement the heat pump function, wherein the chiller branch is connected in parallel to the evaporator branch,
extracting coolant from the AC and heat pump branch by opening a fourth blocking element, which connects the AC and heat pump branch to the low pressure side of the coolant circuit, and closing the third and the second expansion elements and the first blocking element, and
closing the fourth blocking element, either if coolant pressure downstream of the fourth blocking element rises or after a defined period of time.

The existing lines of the coolant circuit are used for this method of implementing an extraction of coolant from a dead volume of the outer condenser or gas cooler for the heating mode, i.e. no additional line sections or valve components are required. The fourth blocking element is closed as a function of the coolant pressure downstream thereof or after a defined period of time.

The defined period of time is determined in that the suction pressure to be set in the system by a controller is set to a minimum permissible value for a period limited to 5 minutes or that the system runs up to such value in a targeted manner before at the end of said period the fourth blocking element is closed and the low pressure can adjust to a higher level depending on the water temperature available at the time, which itself influences the low pressure level.

If the coolant pressure is used for closing the fourth blocking element, it can be determined indirectly or directly.

For indirect determination of the coolant pressure, the coolant temperature of the chiller is detected and the fourth blocking element is closed when the coolant temperature rises.

For direct determination off the coolant pressure, it is directly determined downstream of the fourth blocking element by means of a pressure sensor connected downstream thereof.

In an alternative method for implementing an extraction of coolant from a dead volume of an inner heating condenser or heating gas cooler for AC mode, the following process steps are performed in accordance with the further development:
   providing a check valve connected downstream of the second blocking element to prevent a return flow of coolant into the dead volume,
   extracting coolant from the heating branch by opening the second blocking element and closing both the third blocking element and the third expansion element, and
   expanding of the coolant downstream of the second blocking element by means of the second expansion element while the first and/or fourth expansion elements are open to the maximum extent.

In this method, the existing lines of the coolant circuit are used. To ensure the low pressure required for extraction from the heating branch, the second expansion element assumes the expansion function of the coolant directly within the section downstream of the second blocking element, limited by said second blocking element as well as by the first, second, and fourth expansion elements.

In another alternative method for implementing an extraction of coolant from a dead volume of an inner heating condenser or heating gas cooler for AC mode, the following process steps are performed in accordance with the further development:
   providing a heat pump return branch having a fourth blocking element and a check valve, wherein the AC and heat pump branch and the heat pump return branch are connected to the evaporator branch downstream of the evaporator,
   providing an extraction branch having a fifth expansion element, wherein the extraction branch and the heat pump return branch are connected to the heating branch downstream of the inner heating condenser or heating gas cooler, and
   extracting coolant from the heating branch by opening the fifth expansion element and closing the second, third, and fourth blocking elements and the third expansion element.

The coolant circuit underlying this method, and particularly the insertion of the fifth expansion element, advantageously allow performing a direct triangular process with shortest possible line lengths via the heat return branch and the extraction branch.

The second problem mentioned is solved by a vehicle cooling system having the features of claim 12.

Such a vehicle cooling system having a coolant circuit for an AC mode and a heating mode implemented by means of a heat pump function for performing the method according to an embodiment includes the following components:
   an evaporator branch having an evaporator and an expansion element associated with the evaporator,
   a coolant compressor,
   an AC and heat pump branch having an outer condenser or gas cooler and a second expansion element associated with the same in its function as heat pump evaporator for the heating mode, wherein the AC and heat pump branch can be connected to the high pressure outlet of the coolant compressor via a first blocking element and to the evaporator branch via the second expansion element,
   a heating branch having an inner heating condenser or heating gas cooler and a second blocking element connected downstream thereto, wherein the heating branch can be connected to the high pressure outlet of the coolant compressor via a third blocking element and to the evaporator branch via the second blocking element,
   a third expansion element with which the heating branch can be connected to the AC and heat pump branch, and
   a temperature measuring means for determining the coolant temperature at the inlet of the heating condenser or heating gas cooler.

Such a coolant circuit for performing the method according to an embodiment has a simple structure which also allows performing the extraction processes for the AC mode and the heating mode. The dependent claims disclose other advantageous embodiments of this coolant circuit.

BRIEF DESCRIPTION OF THE DRAWINGS

Other advantages, features, and details of the disclosure can be derived from the following description of preferred embodiments and from the drawings. Wherein.

DETAILED DESCRIPTION

Figure 1:
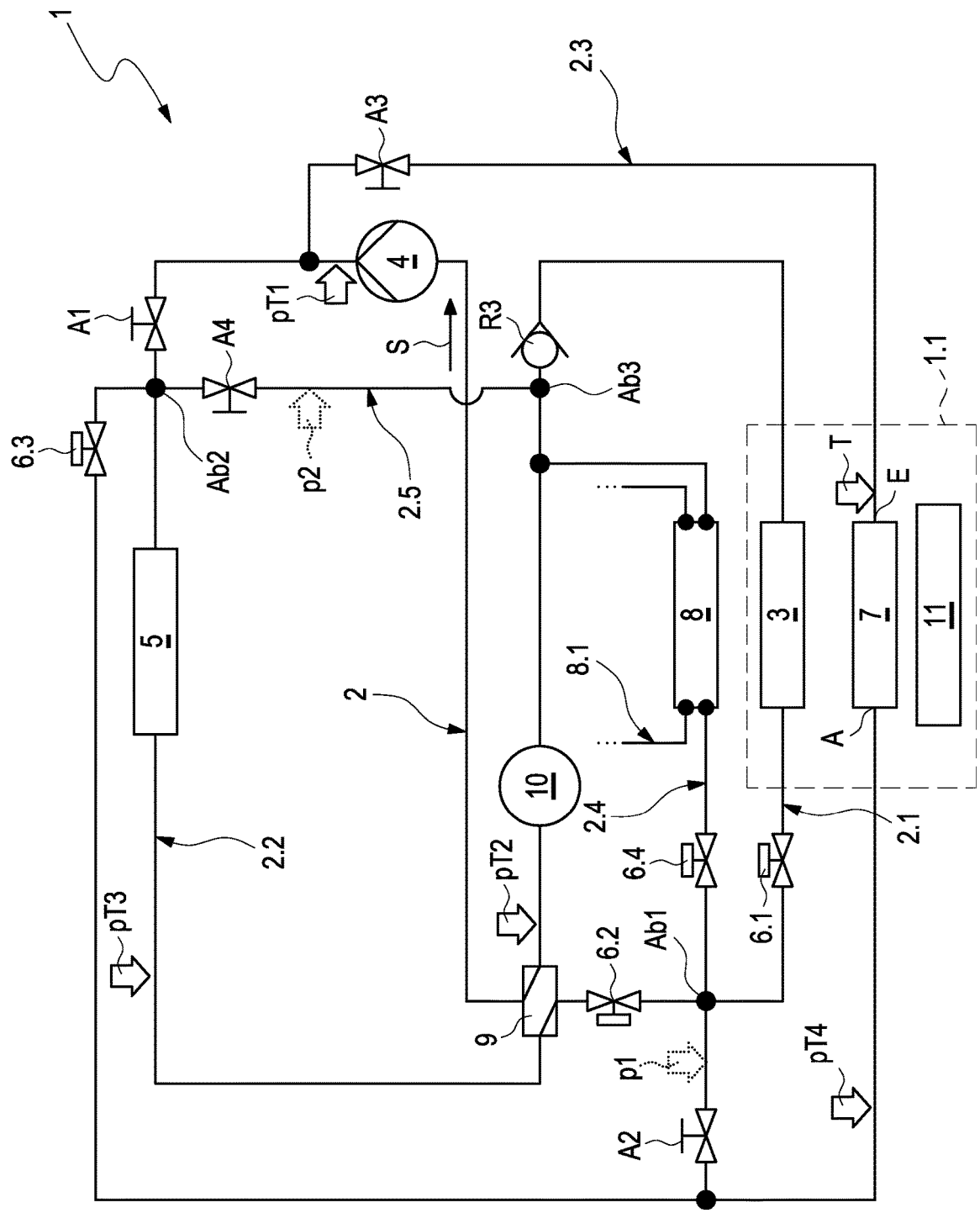
FIG. 1 shows a coolant circuit of a vehicle cooling system for performing the method according to an exemplary embodiment.

The coolant circuits 2 of a vehicle cooling system 1 shown respectively in the FIGS. 1 to 4 have the same basic structure, which will be described first before explaining the differences between the coolant circuits 2. These coolant circuits 2 can be operated in an AC mode and in a heating mode implemented by means of a heat pump function.

Such a coolant circuit 2 consists of an evaporator 3 disposed in an evaporator branch 2.1 with an associated expansion element 6.1, a coolant compressor 4, an outer condenser 5 or gas cooler 5 disposed in an AC and heat pump circuit 2.2 and having a second expansion element 6.2 associated with it in its function as heat pump evaporator for the heating mode, wherein this AC and heat pump branch 2.2 is connected, on the one hand, to the high pressure outlet of the coolant compressor 4 via a blocking element A1 configured as a stop valve and, on the other hand, to the evaporator branch 2.1 via the second expansion element 6.2, forming a branch-off point Ab1. The high pressure side of an inner heat exchanger 9 is disposed between the second expansion element 6.2 and the outer condenser 5 or gas cooler 5, the low pressure side section of said heat exchanger, disposed between the evaporator 2 and coolant compressor 4, having a coolant collector 10 connected upstream thereof.

Furthermore, the coolant circuit 2 consists of a heating branch 2.3 having an inner heating condenser 7 or heating gas cooler 7 (also called a heating register) and a second blocking element A2 configured as a stop valve and connected downstream thereof. Starting from the high pressure side of the coolant compressor 4, the heating branch 2.3 is connected to the coolant compressor 4 by means of a third blocking element A3 configured as a stop valve, while the heating branch 2.3 is connected downstream after the inner heating condenser 7 or heating gas cooler 7 on the one hand to the evaporator branch 2.1 via the second blocking element A2 and the branch-off point Ab1 on the other hand to the outer condenser 5 or gas cooler 5 via a third expansion element 6.3, forming a branch-off point Ab2.

The branch-off point Ab2 connects the first blocking element A1 with the outer condenser 5 or gas cooler 5 and is connected via a heat pump return branch 2.5 to the low pressure side of the coolant compressor 4 by means of a fourth blocking element A4 configured as a stop valve, forming a branch-off point Ab3. On the upstream side, this branch-off point Ab3 is connected to the evaporator branch 2.1 via a check valve R3, and on the downstream side with the coolant collector 10, such that the coolant from said heat pump return branch 2.5 is returned via the coolant collector 10 and the low pressure side of the inner heat exchanger 9 to the coolant compressor 4.

Finally, the coolant circuit 2 comprises a chiller 8 disposed in the chiller branch 2.4 with a fourth expansion element 6.4 associated therewith. This chiller branch 2.4 is connected in parallel to the evaporator branch 2.1, which means it connects the branch-off point Ab1 to the line section between the check valve R3 and the coolant collector 10. This chiller 8 is a coolant-cooling medium heat exchanger having a cooling medium circuit 8.1 with, for example, water as the cooling medium and is used to cool, for example, an electric drive motor, power electronics, and/or a battery. Furthermore, such a chiller 8 is used to implement a water heat pump function by using waste heat from electronic and/or electric components.

The evaporator 3 as well as the inner heating condenser 7 or heating gas cooler 7 are disposed in an air-conditioning device 1.1 together with an electric heating element 11 as additional heater for the supply air flow conducted into the vehicle interior. This electric heating element 11 can for example be configured as a high-voltage PTC heating element.

The two blocking elements A1 and A3 are used to conduct the coolant flow starting from the high pressure side of the coolant compressor 4 and depending on the state of the two blocking elements A1 and A3, either into the AC and heat pump branch 2.2 if the blocking element A1 is open and the blocking element A3 is closed, or into the heating branch 2.3 if the blocking element A3 is open and the blocking element A1 is closed. The two blocking elements A1 and A3 can also be configured as a control valve in the form 3-2-way valve.

In another embodiment, the at least 3 stop valves A1, A3, and A4 can be combined into a multiway valve.

In AC mode of the coolant circuit 1.1, the coolant that has been compressed to high pressure flows from the coolant compressor 2 into the AC and heat pump branch 2.2 with the blocking element A1 open and is relieved from pressure via the outer condenser 5 or gas cooler 5, the high pressure section of the inner heat exchanger 9, the fully open second expansion element 6.2 and the branch-off point Ab1 into the evaporator 3 by means of the first expansion element 6.1 or into the chiller 8 by means of the fourth expansion element 6.4, optionally at the same time into the evaporator 8 and into the chiller 8. The coolant is returned from the evaporator 3 via the check valve R3, the coolant collector 10, and the low pressure side of the inner heat exchanger 9 to the coolant compressor 4. Accordingly, coolant also flows from the chiller 8 via the coolant collector 10 and the low pressure side of the inner heat exchanger 9 back to the coolant compressor 4.

In this AC mode, the heating branch 2.3 is blocked by the third blocking element A3, such that no hot coolant, e.g. R744, can flow through the heating gas cooler 7 due to its high temperature, thereby preventing damage to the air-conditioning device 1.1.

In heating mode when using the chiller 8 for implementing a water heat pump or using the outer condenser 5 or gas cooler 5 as a heat pump evaporator for implementing an air heating pump, the first blocking element A1 is closed and the third blocking element A3 is open, such that hot coolant, e.g. R744, can flow into the heating branch 2.3. To prevent component damage to the air-conditioning device 1.1 by the hot coolant, the heating gas temperature, particularly when using R744 as the coolant, is limited to a maximum temperature value at the inlet E of the inner heating condenser 7 or heating gas cooler 7. This temperature value is specified depending on the maximum tolerable material temperature of the material used for the air-conditioning device 1.1.

A temperature measuring means pT1 configured as a pressure and temperature sensor is disposed at the high pressure outlet of the coolant compressor 4 to determine the coolant temperature at the inlet E of the inner heating condenser 7 or heating gas cooler 7. The temperature value at the inlet E of the heating condenser 7 or heating gas cooler 7 is determined from the temperature value of the temperature measuring means pT1 by means of a characteristic or a characteristic curve stored, for example, in an air conditioning controller. Instead of this temperature measuring means pT1 at the high pressure outlet of the coolant compressor 4, a temperature measuring means T configured as a temperature sensor, with which the temperature of the coolant is determined directly, can be disposed directly at the inlet E of the inner heating condenser 7 or heating gas cooler 7. Alternatively, both temperature measuring means pT1 and T can be used, wherein in this case the temperature measuring means T is also used as a protective function.

The pressure value of the temperature measuring means pT1 configured as a pressure and temperature sensor at the high pressure outlet of the coolant compressor 4 is used to monitor the high pressure value of the coolant and to limit it to a maximum permissible high pressure value.

For performing the heating function using the chiller 8, the coolant compressed by means of the coolant compressor 4 flows via the open third blocking element A3 into the inner heating condenser 7 or heating gas cooler 7 to deliver heat to a supply air flow conducted into the vehicle interior, and then flows via the open second blocking element A2 and the branch-off point Ab1 to be expanded by means of the fourth expansion element 6.4, then flows on into the chiller 8 to absorb waste heat from the electrical and/or electronic components disposed in the coolant circuit 8.1. The second and third expansion elements 6.2 and 6.3 are closed during this heating function.

For performing the heating function using the outer condenser 5 or gas cooler 5 as heat pump evaporator, the coolant compressed by means of the coolant compressor 4 flows via the open third blocking element A3 into the inner heating condenser 7 or heating gas cooler 7 to deliver heat to a supply air flow conducted into the vehicle interior, and then flows via the open second blocking element A2 to be expanded by means of the second expansion element 6.2, then flows on into the outer condenser 5 or gas cooler 5 to absorb heat from the ambient air and then returns to the coolant compressor 4 via the heat pump return circuit 2.5.

An indirect triangular connection is implemented in that the coolant compressed in the coolant compressor 2 is expanded with the second blocking element A2 open into the chiller 8 by means of the fourth expansion element 6.4, wherein at the same time no mass flow is generated on the cooling medium side, i.e. in the cooling medium circuit 8.1, that is, the water used as the cooling medium remains on the cooling medium side of the chiller 8 and does not actively flow through the chiller 8.

In a reheat mode, the supply air flow conducted into the vehicle interior is first cooled by means of the evaporator 3 and then dehumidified, then said supply air flow is reheated by means of the inner heating condenser 7 or heating gas cooler 7 using the heat removed from the supply air flow. A reheat mode of the coolant circuit 2 is performed in various ways depending on the heat balance.

If the heat output in the coolant circuit 2 is sufficient, coolant only flows through the evaporator 3 in that the inner heating condenser or heating gas cooler 7 is brought into fluid communication with the evaporator 3 on the downstream side via the first expansion element 6.1 by means of the open blocking element A2, wherein the fourth expansion element 6.4 associated with the chiller 8 as well as the expansion elements 6.2 and 6.3 leading to the condenser 5 or gas cooler 5 are blocked. From the evaporator 3, coolant flows via the check valve R3, the coolant collector 10, and the inner heat exchanger 9 back into the coolant compressor 4, wherein the heat absorbed in the evaporator 3 is transferred again, together with the heat flow introduced via the coolant compressor 4, to a supply air flow conducted into the vehicle interior via the inner heating condenser 7 or heating gas cooler 7.

If there is a heat deficiency in the coolant circuit 2, the chiller 8 is connected in parallel for heat absorption in addition to the evaporator 3 by opening the fourth expansion element 6.4 and/or the outer condenser 5 or gas cooler 5 by means of the second expansion element 6.2.

In the case of parallel use of the waste heat from the chiller 8 and the ambient heat by means of the outer condenser 5 or gas cooler 5, the coolant compressed by the coolant compressor 4 is divided into three partial flows at the branch-off point Ab1 via the inner heating condenser or heating gas cooler 7 with the second blocking element A2 open and the third expansion element 6.3 closed, namely inti a partial flow expanded via the second blocking element 6.2 into the outer condenser 5 or gas cooler 5, a partial flow expanded via the fourth expansion element 6.4 into the chiller 8, and a partial flow flowing through the evaporator 3 via the first expansion element 6.1. The reference variable for the suction pressure generated is the evaporator 3, which thus specifies the minimum pressure level for the chiller 8 and the outer condenser 5 or gas cooler 5 used as heat pump evaporator. This can be circumvented by integrating a sixth expansion element downstream of the evaporator 3, such that the evaporator can be set to a medium pressure level before the pressure is decreased further for the chiller 8 and the outer condenser 5 or gas cooler 5.

If there is excess heat in reheat mode, heat is transferred to the vehicle environment via the inner heating condenser or heating gas cooler 7 and in addition via the outer condenser 5 or gas cooler 5 before the coolant flows via the evaporator 3 back to the coolant compressor 4. To this end, the coolant is expanded for condensation to an intermediate pressure above the evaporation pressure by means of the third expansion element 6.3 and then expanded to low pressure into the evaporator 3 by means of the first expansion element 6.1.

To control these various operating modes, other pressure-temperature sensors pT2, pT3, and pT4 are disposed in the coolant circuit 2 in addition temperature measuring means pT1 configured as a pressure-temperature sensor. The pressure-temperature sensor pT2 is located between the coolant collector 10 and the low pressure side of the inner heat exchanger 9, the pressure-temperature sensor pT3 is located between the outer condenser 5 or gas cooler 5 and the high pressure side of the inner heat exchanger 9, and the pressure-temperature sensor pT4 is connected downstream of the other heating condenser or heating gas cooler 7.

The differences in the coolant circuits 2 of a vehicle cooling system 1 according to the FIGS. 1 to 3 will be explained in detail below.

In the vehicle cooling system 1 according to FIG. 1, existing lines of the coolant circuit 2 are used for implementing an extraction of coolant from dead volumes for the AC mode or the heating mode.

The following process steps are performed at a startup in AC mode:
  opening the second blocking element A2 and closing both the third blocking element A3 and the third expansion element 6.3, thereby blocking the heating branch 2.3 from the remaining coolant circuit 2.
  extracting coolant from the heating branch 2.3, and
  closing the second blocking element A2 either at increasing coolant pressure downstream of the second blocking element A2 or after a defined period of time to prevent a return of coolant into the heating branch 2.3.

It must be ensured, however, that low pressure is present downstream of the stop valve A2, which pressure is set via the second expansion element 6.2.

The existing lines of the coolant circuit 2 are used for this method of implementing an extraction of coolant from a dead volume of the inner heating condenser 7 or heating gas cooler 7 for AC mode, i.e. no additional line sections or valve components are required. The known use of a check valve is eliminated.

If the coolant pressure is used for closing the second blocking element A2, it can be determined indirectly or directly.

For indirect determination of the coolant pressure, the blower load of a blower of an air-conditioning device 1.1 and/or the setpoint value of air temperature at the evaporator 3 set by a controller of the coolant circuit 2 and/or the pressure curve of the coolant on the low pressure side of the coolant circuit 2 is/are detected and the second blocking element A2 is closed if the blower load decreases and/or the setpoint value increases and/or the coolant pressure on the low pressure side increases.

For direct determination off the coolant pressure, it is directly determined downstream of the second blocking element A2 by means of a pressure sensor p1 connected downstream thereof (see FIG. 1).

When using the alternative method of closing the blocking element A2 after a defined period of time, said period of time is determined in that the system requests a lower air-side evaporator outlet temperature than would be the case in normal operation (e.g. 1° C. instead of 3° C.) for this time window, e.g. limited to 5 minutes. This causes a lower system-side pressure, and extraction potential rises. When the defined and specified period of time elapses, the system is reset to standard parameters, wherein the second stop valve A2 is closed immediately before that to avoid coolant reflux into the heating branch.

Such an extraction process can be repeated after every restart of the vehicle cooling system 1, but it is not necessary if the system was on 100% AC mode before. If the elements A3 and 6.3 are not 100% leak proof, such an extraction process is performed again for each restart of the vehicle cooling system 1 after a down time of, for example, more than 1 hour.

The following process steps are performed at a startup in heating mode by means of a heat pump function:
- opening a fourth blocking element A4 of the heat pump return circuit 2.5 and closing both the second and third expansion elements 6.2 and 6.3 as well as the blocking element A1,
- extracting coolant from the AC and heat pump branch 2.2 via the heat pump return branch 2.5, and
- closing the fourth blocking element A4 either at increasing coolant pressure downstream of the fourth blocking element A4 or after a defined period of time to prevent a return of coolant into the AC and heat pump branch 2.2.

The existing lines of the coolant circuit 2 are used for this method of implementing an extraction of coolant from a dead volume of the outer condenser 5 or gas cooler 5 for the heating mode by means of the heat pump function, i.e. no additional line sections or valve components are required. The known use of a check valve is eliminated. The fourth blocking element A4 is closed as a function of the coolant pressure downstream thereof or after a defined period of time.

If the coolant pressure is used for closing the fourth blocking element A4, it can be determined indirectly or directly.

For indirect determination of the coolant pressure, the coolant temperature of the chiller 8 is detected and the fourth blocking element A4 is closed when the coolant temperature rises.

For direct determination off the coolant pressure, it is directly determined downstream of the fourth blocking element A4 by means of a pressure sensor p2 connected downstream thereof.

When using the alternative method of closing the fourth blocking element A4 after a defined period of time, the defined period of time is determined in that the suction pressure to be set in the system by a controller of the vehicle cooling system 1 is set to a minimum permissible value for a period limited to 5 minutes or that the system runs up to such value in a targeted manner before at the end of said period the fourth blocking element A4 is closed and the low pressure can adjust to a higher level depending on the water temperature available at the time, which itself influences the low pressure level.

Such an extraction process can be repeated after every restart of the vehicle cooling system 1, but it is not necessary if the system was on 100% heating mode before. If the elements A1 and 6.2, and 6.3 are not 100% leak proof, such an extraction process is performed again for each restart of the vehicle cooling system 1 after a down time of, for example, more than 1 hour.

Figure 2:
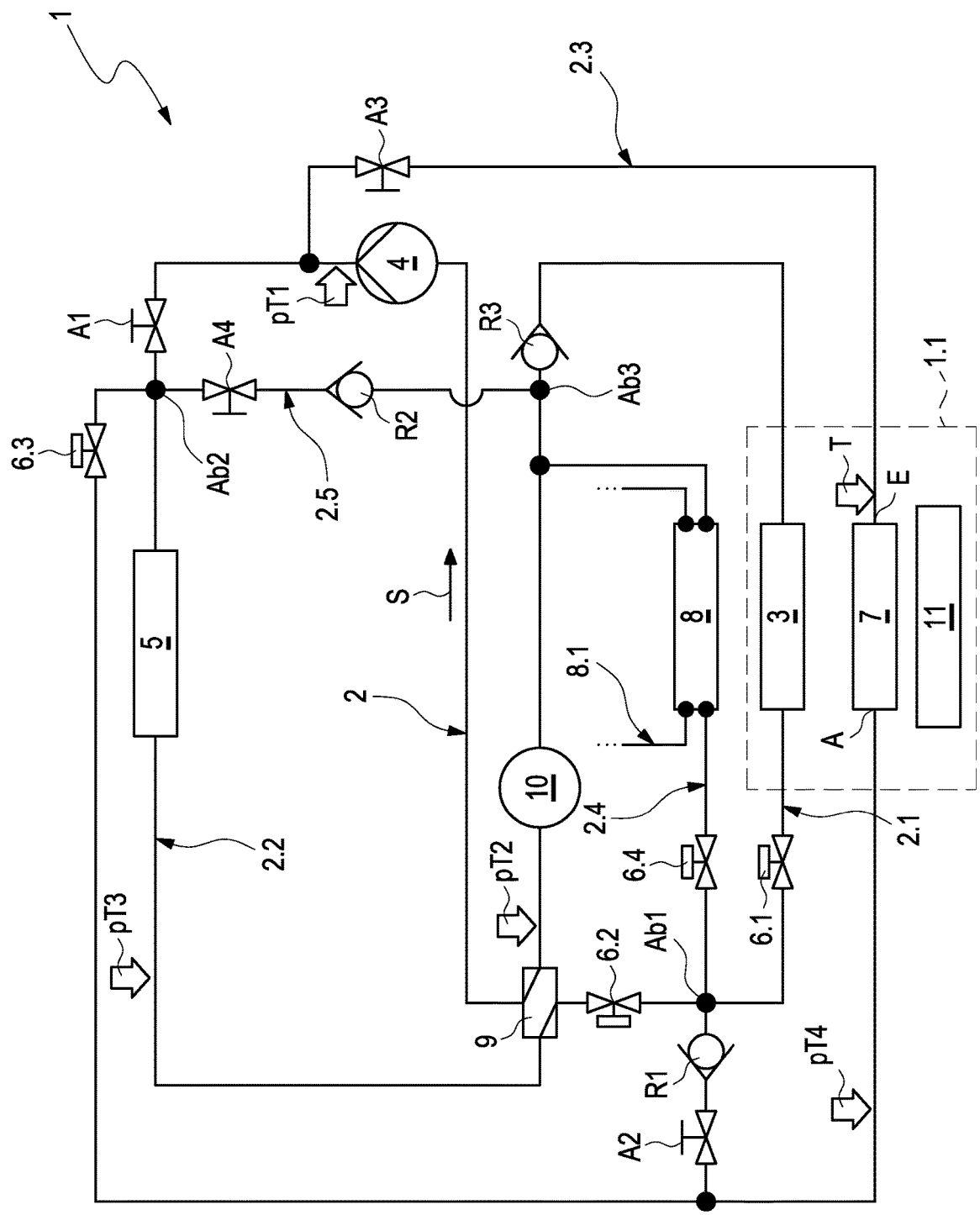
FIG. 2 shows a coolant circuit of a vehicle cooling system for performing the method according to an exemplary embodiment.

The coolant circuit 2 of the vehicle cooling system 1 according to FIG. 2 just differs from that according to FIG. 1 in that a first check valve R1 is disposed between the second blocking element A2 and the branch-off point Ab1 and a second check valve R2 is disposed between the fourth blocking element A4 and the branch-off point Ab3.

This coolant circuit 2 according to FIG. 2 can be used to implement an alternative extraction process for the AC mode compared to that extraction process described in conjunction with FIG. 1.

This extraction process likewise uses existing lines of the coolant circuit 2 to implement the extraction of coolant from the heating branch 2.3, particularly from the inner heating condenser 7 or heating gas cooler.

The following process steps are performed at a startup in AC mode:
- opening the second blocking element A2 and closing both the third blocking element A3 and the third expansion element 6.3,
- extracting coolant from the heating branch (2.3), and
- expanding the coolant downstream of the second blocking element A2 to low pressure level by means of the second expansion element 6.2.

To enable extraction of coolant via the second blocking element A2, the coolant is expanded to low pressure level downstream of the second blocking element by means of the second expansion element 6.2. The first check valve R1 prevents a return of coolant into the heating branch 2.3. The second check valve R2 is used for automatically preventing a reflux of coolant from the low pressure sector into the AC and heat pump branch 2.2 if the low pressure level rises during the active extraction process and to avoid the need for implementing a special extraction process.

During the extraction process, different operating modes can be performed for operating the evaporator 3 and the chiller 8 by means of the coolant circuit 2.

If the interior is cooled using the evaporator 3 or a cooling function is performed by the chiller 8, the coolant mass flow is controlled by means of the second expansion element 6.2 in accordance with a specified value generated by an air-conditioning controller.

It is also possible if both the evaporator 3 and the chiller 8 are operated simultaneously that the evaporator 3 is controlled by the second expansion element 6.2 and the chiller 8 is controlled by means of the fourth expansion element 6.4, wherein the expansion element 6.1 associated with the evaporator 3 is fully open. Alternatively, the chiller 8 can be controlled by means of the second expansion element 6.2 and the evaporator 3 by means of the first expansion element 6.1 associated with the same, wherein in this case the expansion element 6.4 is fully open.

If the extraction is completed, both expansion elements 6.1 and 6.2 take over the control tasks specified by the air-conditioning controller, wherein the second expansion element 6.2 is fully open. Handing the primary control task of the expansion element 6.2 back to the expansion element 6.1 and/or the expansion element 6.4 is continuous and stepless to avoid malfunctions in system operation.

Figure 3:
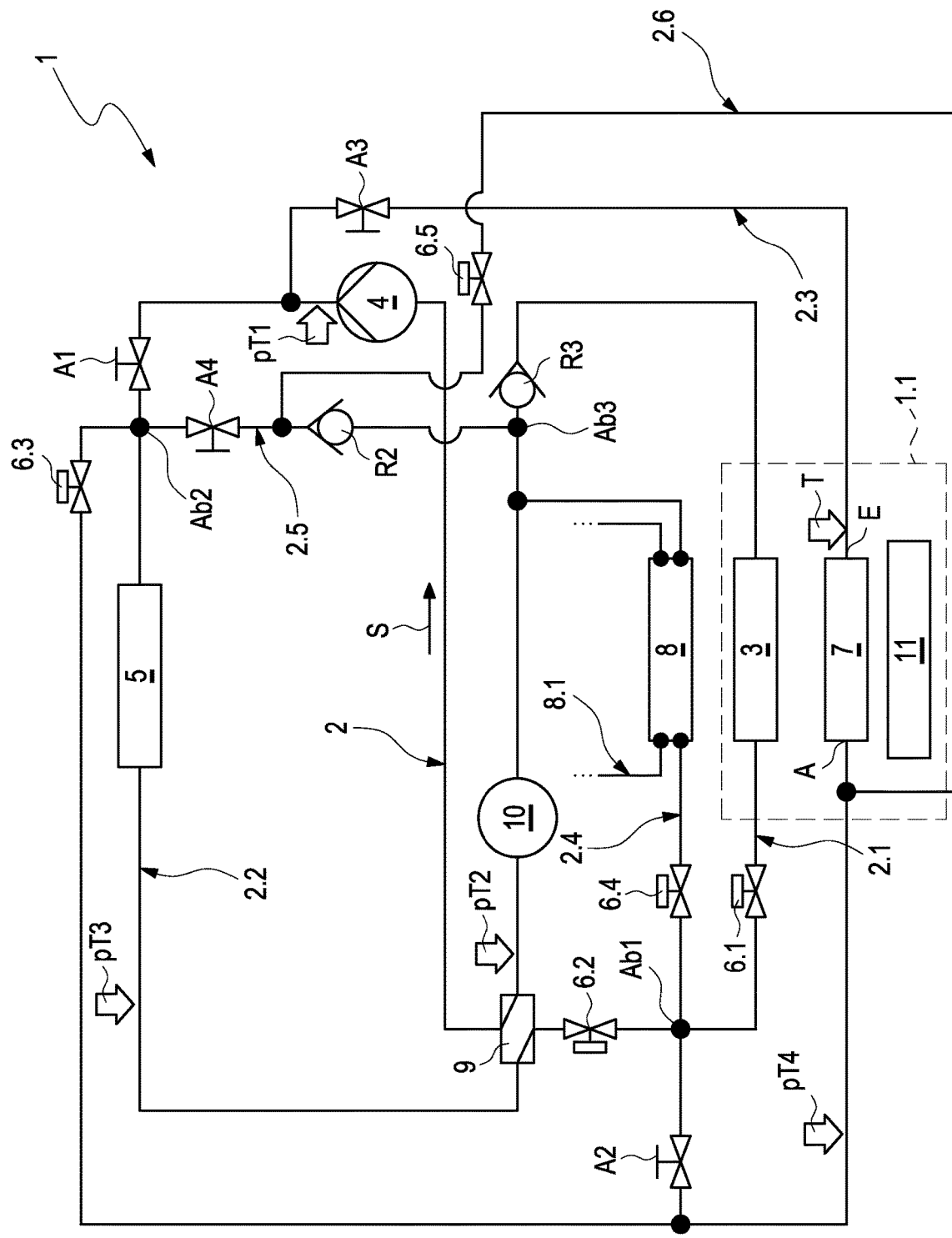
FIG. 3 shows a coolant circuit of a vehicle cooling system for performing the method according to an exemplary embodiment.

The coolant circuit 2 of the vehicle cooling system 1 according to FIG. 3 differs from that of FIG. 1 in that a check valve R2 is disposed in the heat pump return branch 2.5 between the blocking element A4 and the branch-off point Ab3, and an extraction branch 2.6 having a fifth expansion element 6.5 connects this heat pump return branch 2.5, namely the line section between the fourth blocking element A4 and the check valve R2 to the outlet A of the inner heating condenser 7 or heating gas cooler 7.

Thus, in AC mode, coolant can be extracted from the heating branch 2.3 via this extraction branch 2.6 when the expansion element 6.5 is open and the elements 6.3 and A3 are closed.

The use of an expansion element 6.5 instead of a blocking element configured as a stop valve allows the performance of a direct triangular process. Such a heat pump function can still transfer heat to a supply air flow conducted into the vehicle interior by means of the extraction branch 2.6 via the inner heating condenser 7 or heating gas cooler 7 if there is no waste heat from the components used as heat sources in the vehicle and if the outer condenser 5 or gas cooled 5 used as a heat pump evaporator are iced up. In this case, evaporation by means of the evaporator 3, the chiller 8, or the condenser 5 or gas cooler 5 used as the heat pump evaporator is omitted and the coolant is just compressed and the compressor heat transferred at the inner heating condenser 7 or heating gas cooler 7.

Figure 4:
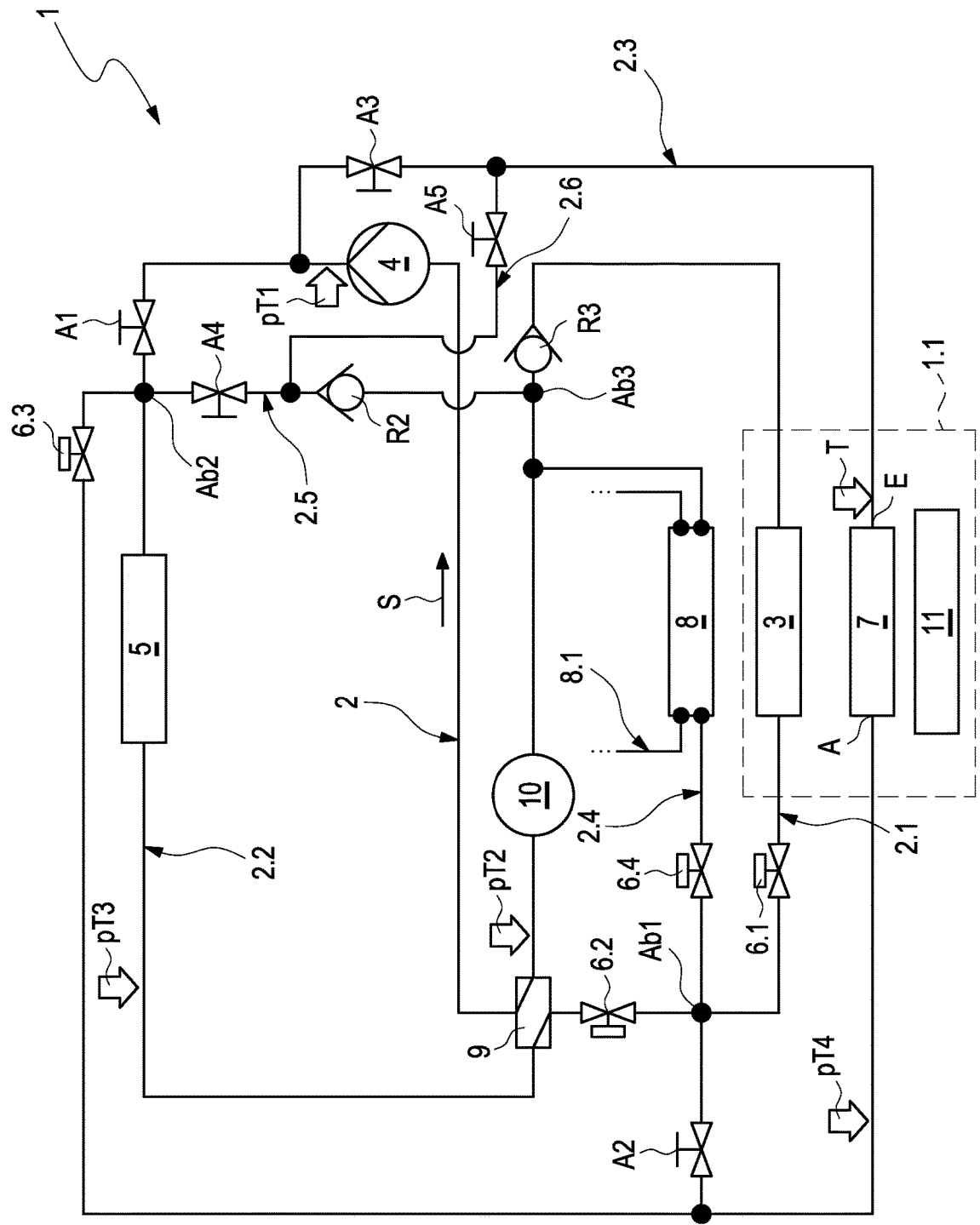
FIG. 4 shows a coolant circuit of a vehicle cooling system for performing the method according to an exemplary embodiment.

The coolant circuit 2 of the vehicle cooling system 1 according to FIG. 4 just differs from that according to FIG. 3 in that, on the one hand, the extraction branch 2.6 is not connected to the heating branch 2.3 at the outlet of the inner heating condenser 7 or heating gas cooler 7, but upstream of this component, that is, between the third blocking element A3 and said inner heating condenser 7 or heating gas cooler 7, and in that the extraction branch 2.6 has a fifth stop valve A5 instead of an expansion element.

Thus, in AC mode of this coolant circuit 2 according to FIG. 4, coolant can be extracted from the heating branch 2.3 via this extraction branch 2.6 when the fifth stop valve A5 is open and the elements 6.3 and A3 are closed.

In analogy to the descriptions of the coolant circuit 2 according to FIG. 1 with respect to omitting the check valves R1 and R2 or methods for eliminating them, this measure can also be applied to system configurations according to FIGS. 2 to 4.

In the coolant circuits 2 described in FIGS. 1 to 4, the reheat mode at excess heat is performed in that heat is transferred to the vehicle environment via the outer condenser 5 or gas cooler 5 before the coolant flows via the evaporator 3 back to the coolant compressor 4. To this end, the heating branch 2.3 is connected to the AC and heat pump branch 2.2 via the third expansion element 6.3, such that coolant is expanded to an intermediate pressure into the outer condenser or gas cooler 5 and then is expanded to low pressure into the evaporator 3 via the expansion element 6.1.

In addition to the functions of water and air heat pump described, combined operation of the two configurations is possible, that is, heat from the water circuit and from the environment is absorbed in parallel. The extraction functions for coolant shown are not used in this context, however.

It is furthermore conceivable to use an indirect water-cooled condenser or gas cooler instead of the direct inner heating condenser or heating gas cooler 7 before the supply air flow into the passenger compartment is heated via a downstream coolant-air heat exchanger. The extraction functions are performed as described above.

REFERENCE NUMERALS

1 Vehicle cooling system
1.1 Air-conditioning device of the vehicle cooling system 1
2 Coolant circuit of the vehicle cooling system 1
2.1 Evaporator branch of the coolant circuit 2
2.2 AC and heat pump branch of the coolant circuit 2
2.3 Heating branch of the coolant circuit 2
2.4 Chiller branch of the coolant circuit 2
2.5 Heat pump return branch of the coolant circuit 2
2.6 Extraction branch of the coolant circuit 2
3 Evaporator
4 Coolant compressor
5 Outer condenser, gas cooler
6.1 First expansion element
6.2 Second expansion element
6.3 Third expansion element
6.4 Fourth expansion element
6.5 Fifth expansion element
7 Inner heating condenser or heating gas cooler
8 Chiller
8.1 Coolant circuit of the chiller 8
9 Internal heat exchanger
10 Coolant collector
11 Electrical heating element
A Outlet of the heating condenser or heating gas cooler 7
Ab1 Branch-off point of the coolant circuit 2
Ab2 Branch-off point of the coolant circuit 2
Ab3 Branch-off point of the coolant circuit 2
A1 First blocking element
A2 Second blocking element
A3 Third blocking element
A4 Fourth blocking element
A5 Fifth blocking element
E Inlet of the heating condenser or heating gas cooler 7
p1 Pressure sensor
p2 Pressure sensor
pT1 Temperature measuring means
R1 Check valve
R2 Check valve
S Flow direction of the coolant
T Temperature measuring means

The invention claimed is:

1. A method for operating a coolant circuit of a vehicle cooling system in an AC mode and in a heating mode, implemented by a heat pump function, comprising:
an evaporator branch having an evaporator and an expansion element associated with the evaporator;
a coolant compressor;
an AC and heat pump branch having an outer condenser or gas cooler and a second expansion element as a heat pump evaporator for the heating mode, wherein the AC and heat pump branch is connected to the high pressure outlet of the coolant compressor via a first blocking element and to the evaporator branch via the second expansion element;
a heating branch having an inner heating condenser or heating gas cooler and a second blocking element connected downstream thereto, wherein the heating branch is connected to the high pressure outlet of the coolant compressor via a third blocking element and to the evaporator branch via the second blocking element;
a third expansion element with which the heating branch is connected to the AC and heat pump branch; and
a temperature measuring device for determining the coolant temperature at the inlet of the heating condenser or heating gas cooler, wherein
in the heating mode, the coolant temperature at the inlet of the inner heating condenser or heating gas cooler is limited to a maximum temperature value
wherein the following process steps are performed at a startup in AC mode:
extracting coolant from the heating branch by opening the second blocking element and closing both the third blocking element and the third expansion element; and
closing the second blocking element, either if coolant pressure downstream of the second blocking element rises or after a defined period of time.

2. The method according to claim 1, wherein:
the temperature measuring device is disposed at the high pressure outlet of the coolant compressor; and
the coolant temperature at the inlet of the heating condenser or heating gas cooler is determined by a sensor value generated by the temperature measuring device.

3. The method according to claim 1, wherein the coolant temperature is determined by a temperature measuring device disposed at the inlet of the heating condenser or heating gas cooler.

4. The method according to claim 1, wherein the coolant pressure downstream of the second blocking element is detected indirectly in that the blower load of a blower of an air-conditioning device and/or the setpoint value of air temperature at the evaporator set by a controller of the coolant circuit and/or the pressure curve of the coolant on the low pressure side of the coolant circuit is/are detected and the second blocking element is closed if the blower load decreases and/or the setpoint value increases and/or the coolant pressure on the low pressure side increases.

5. The method according to claim 1, wherein the coolant pressure downstream of the second blocking element is determined directly by a pressure sensor connected downstream thereof.

6. The method according to claim 1, wherein the following process steps are performed at a startup in heating mode by a heat pump function or a triangular process:
providing a chiller branch having a chiller and an associated fourth expansion element to implement the heat pump function, wherein the chiller branch is connected in parallel to the evaporator branch;
extracting coolant from the AC and heat pump branch by opening a fourth blocking element, which connects the AC and heat pump branch to the low pressure side of the coolant circuit, and closing the third and the second expansion elements and the first blocking element; and
closing the fourth blocking element, either if coolant pressure downstream of the fourth blocking element rises or after a defined period of time.

7. The method according to claim 6, wherein the coolant pressure downstream of the fourth blocking element is detected indirectly in that the coolant temperature of the chiller is detected and the fourth blocking element is closed when the coolant temperature rises.

8. The method according to claim 6, wherein the coolant pressure downstream of the fourth blocking element is determined directly by a pressure sensor connected downstream thereof.

9. The method according to claim 1, wherein the following process steps are performed at a startup in AC mode:
providing a check valve connected downstream of the second blocking element to prevent a return flow of coolant into the heating branch;
extracting coolant from the heating branch by opening the second blocking element and closing both the third blocking element and the third expansion element; and
expanding the coolant downstream of the second blocking element to low pressure level by the second expansion element while the first and/or fourth expansion elements are open to the maximum extent.

10. The method according to claim 1, wherein the following process steps are performed at a startup in AC mode:
providing a heat pump return branch having a fourth blocking element and a check valve, wherein the AC and heat pump branch and the heat pump return branch are connected to the evaporator branch downstream of the evaporator;
providing an extraction branch having a fifth expansion element, wherein the extraction branch and the heat pump return branch are connected to the heating branch downstream of the inner heating condenser or heating gas cooler; and
extracting coolant from the heating branch by opening the fifth expansion element and closing the second, third, and fourth blocking elements and the third expansion element.

11. A vehicle cooling system having a coolant circuit for an AC mode and a heating mode, comprising:
an evaporator branch having an evaporator and an expansion element associated with the evaporator;
a coolant compressor;
an AC and heat pump branch having an outer condenser or gas cooler, and a second expansion element as a heat pump evaporator for the heating mode, wherein the AC and heat pump branch is connected to the high pressure outlet of the coolant compressor via a first blocking element and to the evaporator branch via the second expansion element;
a heating branch having an inner heating condenser or heating gas cooler and a second blocking element connected downstream thereto, wherein the heating branch can be connected to the high pressure outlet of the coolant compressor via a third blocking element and to the evaporator branch via the second blocking element;
a third expansion element with which the heating branch can be connected to the AC and heat pump branch; and
a temperature measuring device for determining the coolant temperature at the inlet of the heating condenser or heating gas cooler
wherein the following process steps are performed at a startup in AC mode:
extracting coolant from the heating branch by opening the second blocking element and closing both the third blocking element and the third expansion element; and
closing the second blocking element, either if coolant pressure downstream of the second blocking element rises or after a defined period of time.

12. The vehicle cooling system according to claim 11, wherein a pressure sensor is connected downstream of the second blocking element.

13. The vehicle cooling system according to claim 11, wherein
a chiller branch having a chiller and an associated fourth expansion element is provided for implementing a water heat pump function;
the chiller branch is connected in parallel to the evaporator branch; and
a fourth blocking element is provided, with which the AC and heat pump branch is connected to the low pressure side of the coolant circuit, and
a pressure sensor is provided downstream of the fourth blocking element.

14. The vehicle cooling system according to claim 11, wherein a check valve is connected downstream of the second blocking element.

15. The vehicle cooling system according to claim 11, wherein
a heat pump return branch having a fourth blocking element and a check valve is provided, wherein the AC and heat pump branch and the heat pump return branch can be connected to the evaporator branch downstream of the evaporator; and
an extraction branch having a fifth expansion element is provided, wherein the extraction branch and the heat pump return branch can be connected to the heating branch downstream of the inner heating condenser or heating gas cooler.

* * * * *